(12) United States Patent
Yeh (10) Patent No.: US 8,344,914 B2
(45) Date of Patent: Jan. 1, 2013

(54) INTELLIGENT MULTI-AXIAL INTUITIVE JOYSTICK SUITABLE FOR USE BY BOTH LEFT-HANDERS AND RIGHT-HANDERS

(76) Inventor: Tzu-Yuan Yeh, Taipei (TW)

( * ) Notice: Subject to any disclaimer, the term of this patent is extended or adjusted under 35 U.S.C. 154(b) by 507 days.

(21) Appl. No.: 12/645,978

(22) Filed: Dec. 23, 2009

(65) Prior Publication Data

US 2011/0148667 A1 Jun. 23, 2011

(51) Int. Cl.
*G06F 3/033* (2006.01)
*G05G 9/047* (2006.01)

(52) U.S. Cl. .................. 341/20; 345/161; 74/471 XY (58) Field of Classification Search ............. 341/20; 345/161; 74/417 XY; 200/6 A, 6 R
See application file for complete search history.

(56) References Cited

U.S. PATENT DOCUMENTS

| | | | | |
|---|---|---|---|---|
| 4,584,510 | A * | 4/1986 | Hollow | 318/584 |
| 4,748,441 | A * | 5/1988 | Brzezinski | 345/161 |
| 5,749,577 | A * | 5/1998 | Couch et al. | 273/148 B |
| H1822 | H * | 12/1999 | Kelley et al. | 180/333 |
| 6,429,849 | B1 * | 8/2002 | An et al. | 345/161 |
| 7,129,428 | B2 * | 10/2006 | Edmunds | 200/6 A |
| 7,418,302 | B2 * | 8/2008 | Gharsalli | 700/72 |
| 2009/0090208 | A1 * | 4/2009 | Diccion | 74/471 XY |
| 2009/0213073 | A1 * | 8/2009 | Obermeyer et al. | 345/161 |

* cited by examiner

*Primary Examiner* — Howard Williams
(74) *Attorney, Agent, or Firm* — Guice Patents PLLC (57) ABSTRACT

Provided is an intelligent multi-axial intuitive joystick suitable for use by both left-handers and right-handers and applicable to machine tools, measuring equipment, cars, and so on, which require moving instructions. The joystick features at most four-axis output control, multiple output modes to select from, a dead-band setting function, axial angle shift detection, origin calibration, feedback from axial force application, Z- and C-axis intuitive operation, working status display, and system surveillance.

16 Claims, 9 Drawing Sheets

INTELLIGENT MULTI-AXIAL INTUITIVE JOYSTICK SUITABLE FOR USE BY BOTH LEFT-HANDERS AND RIGHT-HANDERS

BACKGROUND OF THE INVENTION

1. Technical Field

The present invention relates to an intelligent multi-axial intuitive joystick which is suitable for use by both left-handers and right-handers, capable of multiple special functions, and applicable to various machines requiring moving instructions.

2. Description of Related Art

Unidirectional or multi-directional operation is often required in general machine tools, industry-specific machinery, application-specific tools, or transmission equipment, for controlling the movement of various mechanisms, such as the forward/backward or upward/downward movement of a mechanical shaft or arm. Therefore, the advent of control joysticks has brought tremendous convenience to related operators. An operator only has to hold and gently push the joystick forward, backward, leftward, or rightward to effectively control the movement of different machine parts. In a nutshell, the joystick makes it possible to control everything in one hand.

Commercially available hand-operated joysticks with a single-spring center-resetting mechanism typically provide biaxial control along the X- and Y-axes. The so-called biaxial control generally includes control along the X-axis, whereby a certain mechanism is moved forward and backward; and control along the Y-axis such that the mechanism can be moved leftward and upward, as well as rightward and downward. Of course, biaxial control also includes controlling the mechanism diagonally, such as by pushing the joystick in directions between the X- and Y-axes, thus moving the mechanism forward, leftward, and upward at the same time; or forward, rightward, and downward at the same time; or backward, leftward, and upward at the same time; or backward, rightward, and downward at the same time. However, biaxial control joysticks do not provide precise diagonal control (i.e., control along directions between the X- and Y-axes) and therefore may sometimes lead to incorrect operations.

In consideration of the foregoing, the joystick industry has developed the triaxial (X-, Y-, and Z-axis) joystick with an additional rotating element, wherein the head of the joystick is rotatable to control the movement of one or another mechanism. More specifically, in such a triaxial control unit, control along the X- and Y-axes corresponds to forward, backward, leftward, and rightward movement; and control along the Z-axis corresponds to upward and downward movement, wherein the correspondence between the X-, Y-, and Z-axes and the various moving directions may vary.

Although the additional Z-axis offers convenience in operation, the triaxial joystick still has its disadvantages. First of all, control can only be carried out along the three axes. Secondly, as the control mechanism of the Z-axis secondary controller consists in rotating the head of the joystick, it is often confusing to the operator whether the clockwise or counterclockwise rotation corresponds to forward, backward, leftward, rightward, upward, or downward movement, and such confusion may cause incorrect operations of serious consequences. The major drawback of this design is that the operation required is not intuitive; in other words, the operation does not conform to the habits of the human body.

In addition, neither the biaxial nor the triaxial joystick has a dead band. Therefore, if the joystick is touched or shaken by accident, an abnormal instruction or an incorrect operation may be activated and result in immediate danger.

In contrast to the design concept of dead bands, an operator trying to operate the joystick and applies a force thereto may still move the joystick by mistake and give rise to incorrect operations.

Moreover, during the manufacturing process of a joystick or after the joystick has been used for some time, it is often very difficult for the joystick to return exactly to the intersection point of a cross, i.e., the point (0, 0) on the X-Y plane, when the joystick resumes its original position. In practice, a joystick tends to be offset slightly from the original center point. However, if the offset position is used as the origin from which the joystick is re-activated to control the movement of a certain mechanism, subsequent errors or incorrect operations will be aggravated. This phenomenon is mainly due to the lack of an origin calibration function.

Besides, a user of the conventional joystick will not receive reliable feedback from the joystick in hand of the magnitude of force applied to the joystick. Also, the conventional joystick does not have an axial-direction limiting element and therefore does not provide effective control along non-diagonal directions.

In addition, the conventional Z- and C-axis intuitive operation requires the use of the thumb. However, as the dexterity of the thumb is different between the left and right hands, the operation may be clumsy.

It is also well known that the conventional joystick does not have a working status display function. Hence, there is no information available for the operator to know whether the joystick is in a standby mode or is out of order, let alone the magnitude of force applied or the distance moved.

The conventional rotary secondary joystick member tends to be mistaken. Further, the conventional joystick does not provide connection for system surveillance. According to above description, the conventional joystick obviously leaves much room for improvement.

BRIEF SUMMARY OF THE INVENTION

In view of the drawbacks of the conventional hand-operated joysticks, the inventor of the present invention made extensive research and finally developed a multi-axial intuitive joystick suitable for use by both left-handers and right-handers, as disclosed herein.

The joystick of the present invention is additionally provided with a secondary joystick member corresponding in position to a user's thumb when the joystick is held in the user's hand. Thus, the joystick of the present invention is capable of four-axis output control, has the functions of various devices, and can reduce the costs of production and use.

The joystick of the present invention has a top end provided with a switch which is selectively connectable to serial-signal, digital-signal (1/0), and analog-signal programs built-in a circuit board, thus allowing the user to select the desired output mode.

The joystick of the present invention includes a magnetic sensor built-in with a microprocessor control circuit that defines a dead band. Therefore, if the joystick is only slightly moved within a predetermined radius from a center point, no actions will be activated, and incorrect operations are effectively prevented.

In order to avoid incorrect operations which may otherwise result from touching or shaking the joystick by mistake or which depart from the operator's intention, the joystick of the present invention is particularly configured for axial angle shift detection. When the operator applies a force to the joystick, the distance moved or the angle tilted must be larger than a pre-set value for an instruction to be activated. This design can also prevent operations which may otherwise result from touching or shaking the joystick by mistake or which are contrary to the operator's intention.

In the joystick of the present invention, the microprocessor control circuit is provided with an origin calibration circuit. Hence, when the joystick resumes its original position, either during the production process or after use, the point to which the joystick returns is used as the origin, thereby minimizing operational errors or incorrect operations.

According to the present invention, the head of the joystick is provided with a fulcrum ring having a surface formed with diamond pyramid-shaped projections. Thus, the magnitude of force applied and the distance moved can be known by feedback from the pressure of a spring, allowing the operator to determine for sure whether or not the force is applied along the non-diagonal X- and Y-directions.

The joystick of the present invention can be provided with a cross-shaped non-diagonal direction limiting element having a cross-shaped opening so that, when biaxial or four-axis output applies, the output is limited to only one non-diagonal direction at a time. This design is intended to prevent incorrect instructions or incorrect operations and is particularly useful for machinery whose operation is limited to non-diagonal directions.

According to the present invention, a light-permeable ring is provided at the head of the joystick, and a light-emitting diode (LED) is connected to a circuit on the circuit board so as to emit light and provide specific information to the operator as to whether the joystick is in a standby mode or out of order, as well as the magnitude of force applied and the distance moved.

According to the present invention, the head of the joystick is rotatable to various positions, thus rendering the joystick suitable for use by both left-handers and right-handers. Besides, the secondary joystick member is based on an intuitive design; in other words, the secondary joystick member is configured to be pushed forward, backward, leftward, and rightward according to the operator's intuition.

The joystick of the present invention is provided with a system surveillance device. When connected to the joystick, the system surveillance device can rapidly determine whether or not the vectors of the joystick are normal.

BRIEF DESCRIPTION OF THE SEVERAL VIEWS OF THE DRAWINGS

FIGS. 7-A to 7-F schematically show feedback from axial force application, enabled by the fulcrum ring of the present invention according to the compression ratio of a spring;

FIGS. 9-A to 9-E schematically show how the present invention is equally suitable for use by left-handers and right-handers;

DETAILED DESCRIPTION OF THE INVENTION

Figure 1:
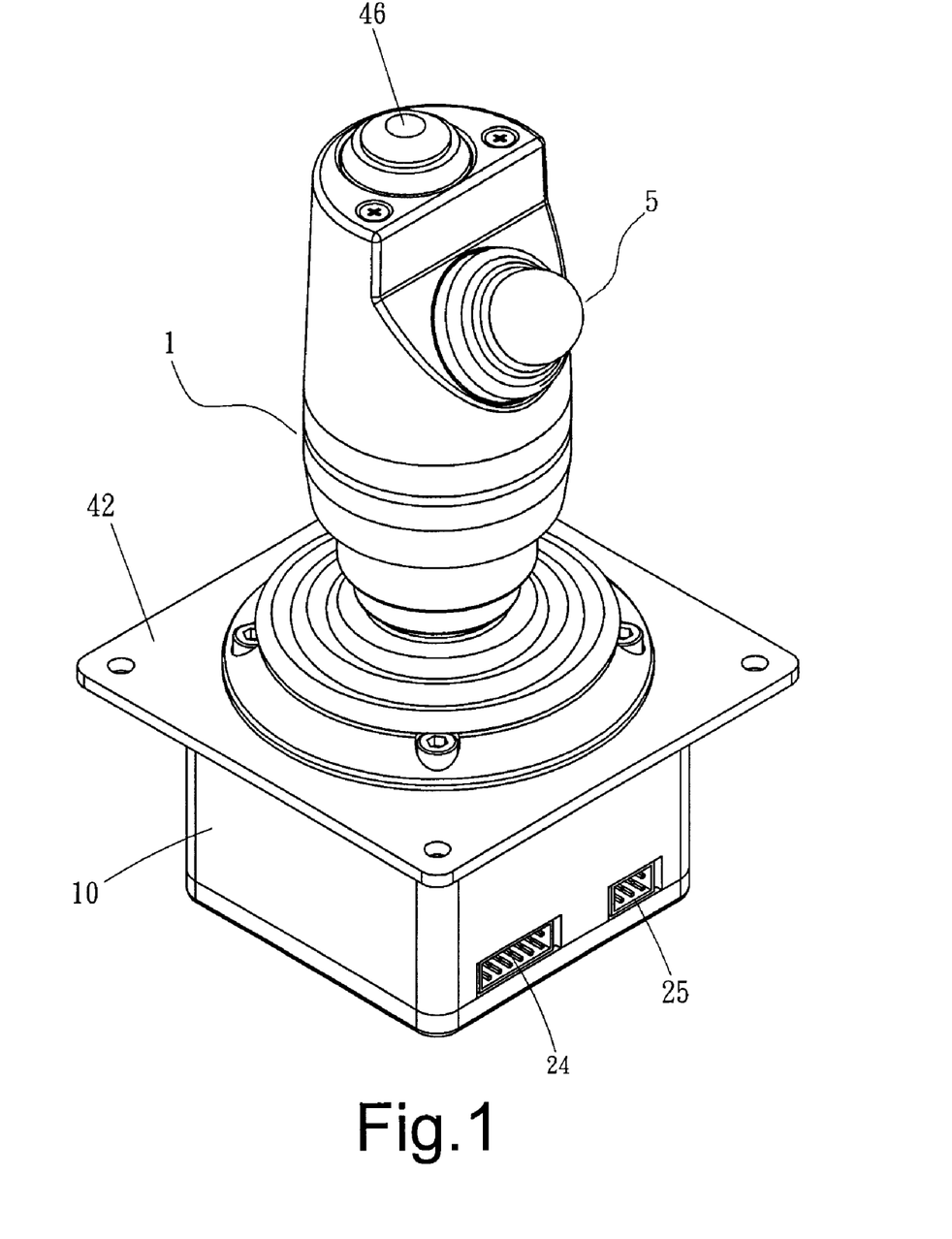
FIG. 1 is a perspective view of the present invention.
Figure 2:
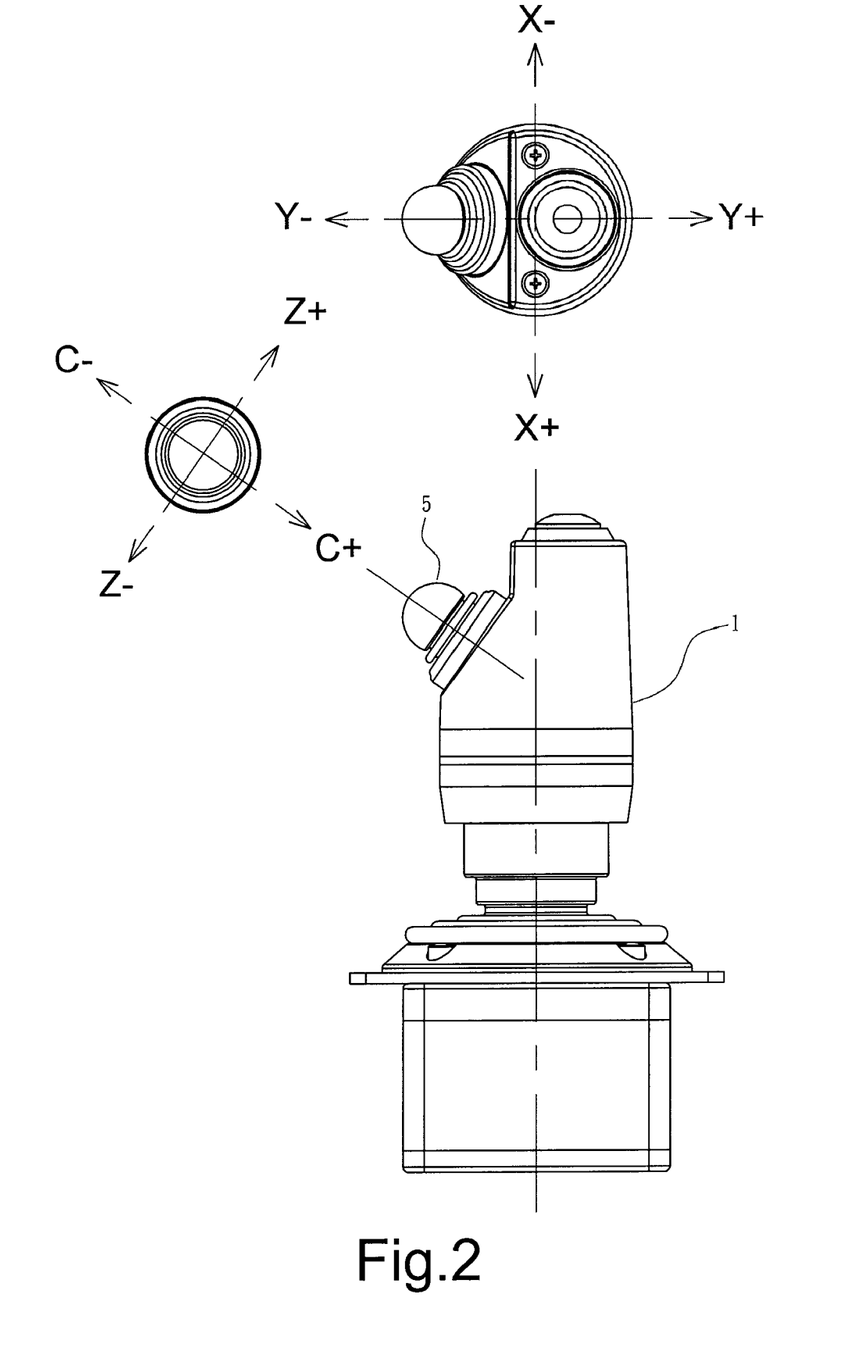
FIG. 2 schematically shows the simultaneous four-axis (X-, Y-, Z-, and C-axis) control of the present invention.

Referring to FIG. 1, according to the present invention, a multi-axial intuitive joystick suitable for use by both left-handers and right-handers includes a primary joystick member 1 and a small secondary joystick member 5 attached to the primary joystick member 1. As shown in FIG. 2, the joystick of the present invention is capable of four-axis control, namely control along the X-, Y-, Z-, and C-axes.

Figure 3:
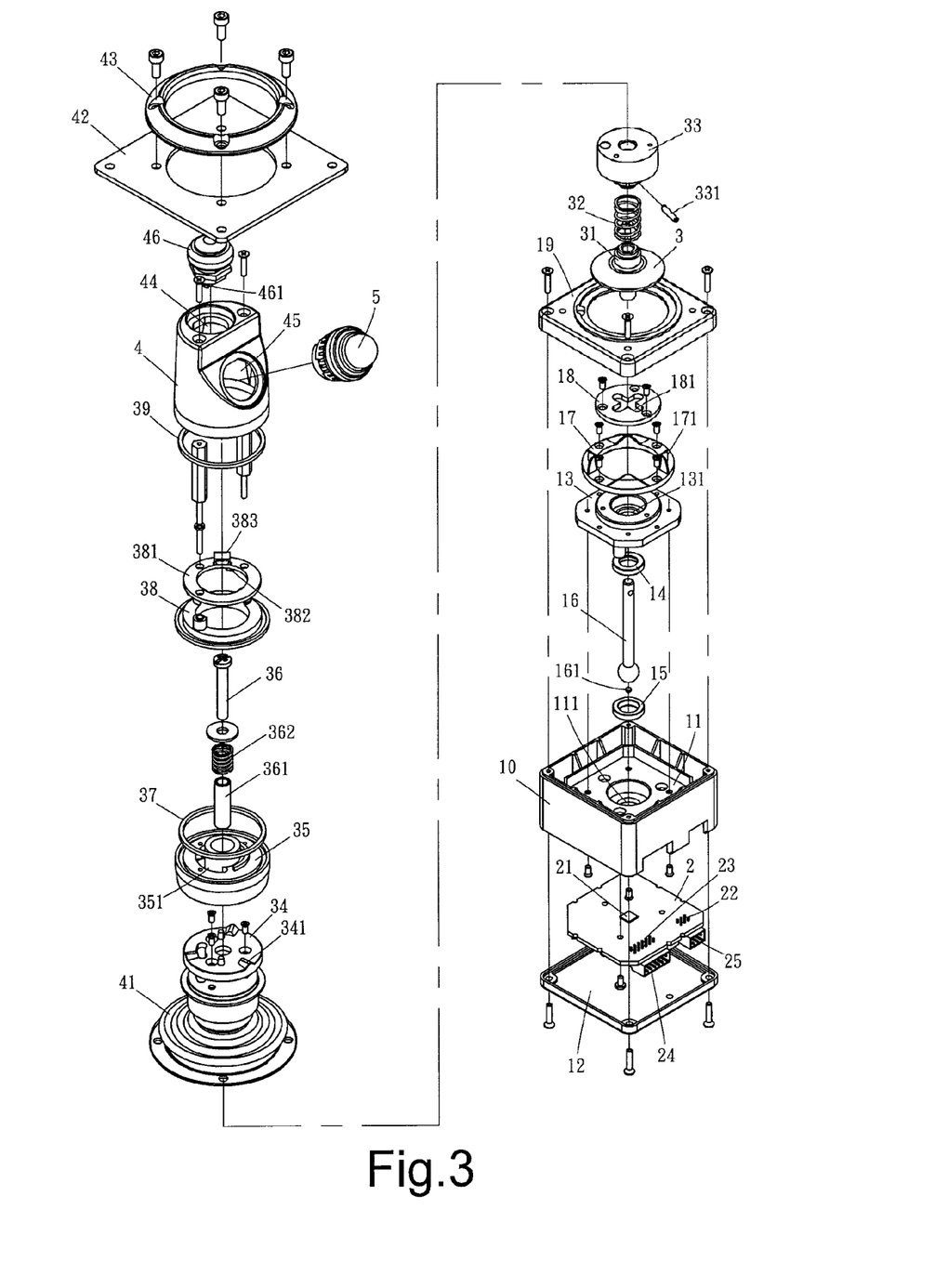
FIG. 3 is an exploded perspective view of the present invention.

Referring to FIG. 3, the primary joystick member 1 includes a box-shaped base 10. The box-shaped base 10 is provided therein with an internal partition 11 centrally formed with an aperture 111. A control mainboard 2 is fixedly provided at a lower end of the partition 11. The box-shaped base 10 has a bottom end closed by a base lower cover 12.

The control mainboard 2 is provided with a microprocessor control circuit which includes a switch program for selecting among serial-signal, digital-signal, and analog-signal programs; a dead-band setting program; an axial angle shift detection program; an origin calibration circuit; a primary-joystick-member digital processing sensor 21; input connector terminals 22 and 23; an output connector terminal 24; and a system surveillance connector terminal 25.

A copper-ring fixing seat 13 is fixedly provided above the internal partition 11 of the box-shaped base 10 and centrally formed with an aperture 131. A ball stick 16 is inserted through and rotatably installed on the copper-ring fixing seat 13 by means of an upper copper ring 14 and a lower copper ring 15. The ball stick 16 has a ball. A magnet 161 is fixedly provided at a lower end of the ball and corresponds in position to the primary-joystick-member digital processing sensor 21. The ball stick 16 also has an upper part formed as a shaft, which passes through the aperture 131 of the copper-ring fixing seat 13 and extends upward.

Mounted on the copper-ring fixing seat 13 are a fulcrum ring 17 and a cross-shaped non-diagonal direction limiting element 18, wherein the fulcrum ring 17 is provided with diamond pyramid-shaped projections 171, and the cross-shaped non-diagonal direction limiting element 18 is formed with a cross-shaped opening 181. A base upper cover 19 above the copper-ring fixing seat 13 closes an upper end of the box-shaped base 10.

The ball stick 16, which passes through the aperture 131 of the copper-ring fixing seat 13 and extends upward, has an upper end located above the copper-ring fixing seat 13 and inserted into a sliding block 3. A spring 32 is mounted around a neck 31 extending upward from the sliding block 3 and has an upper end connected to a handle base 33. An angle fixing plate 34 rests on the handle base 33 and is covered by a rotating seat 35, wherein the angle fixing plate 34 is formed with symmetric positioning blocks 341, and the rotating seat 35 has a circular groove 351. The circular groove 351 is inserted by a screw rod 36, a sleeve 361, and a spring 362, while the handle base 33 is laterally inserted by a spring pin 331. Thus, the handle base 33, the angle fixing plate 34, and the rotating seat 35 are assembled into a one-piece unit capable of being rotated to different positions. In consequence, the primary joystick member 1 can be rotated to and positioned at different angles and be comfortably used by left-handers as well as right-handers.

A flat washer 37 is placed in the rotating seat 35 from above. Moreover, an indicator lamp ring 38 and an indicator lamp circuit board 381 are fixedly provided on an upper side of the rotating seat 35. A handle upper cover 4, along with an upper ring of a rubber dust guard 41, is fixedly provided on the rotating seat 35 via a flat washer 39 located above the indicator lamp ring 38. The rubber dust guard 41 has a lower ring fixedly provided on the base upper cover 19 via a main-body fixing plate 42 and a dust-guard pressing cover 43. Thus, a basic hand-operated joystick is completed.

The handle upper cover 4 has a top end formed with a hole 44 and an a lateral portion formed with another hole 45, wherein the hole 44 is configured to receive a pushbutton switch 46, and the hole 45 is configured to receive the small secondary joystick member 5 capable of X- and C-axis control.

Figure 4:
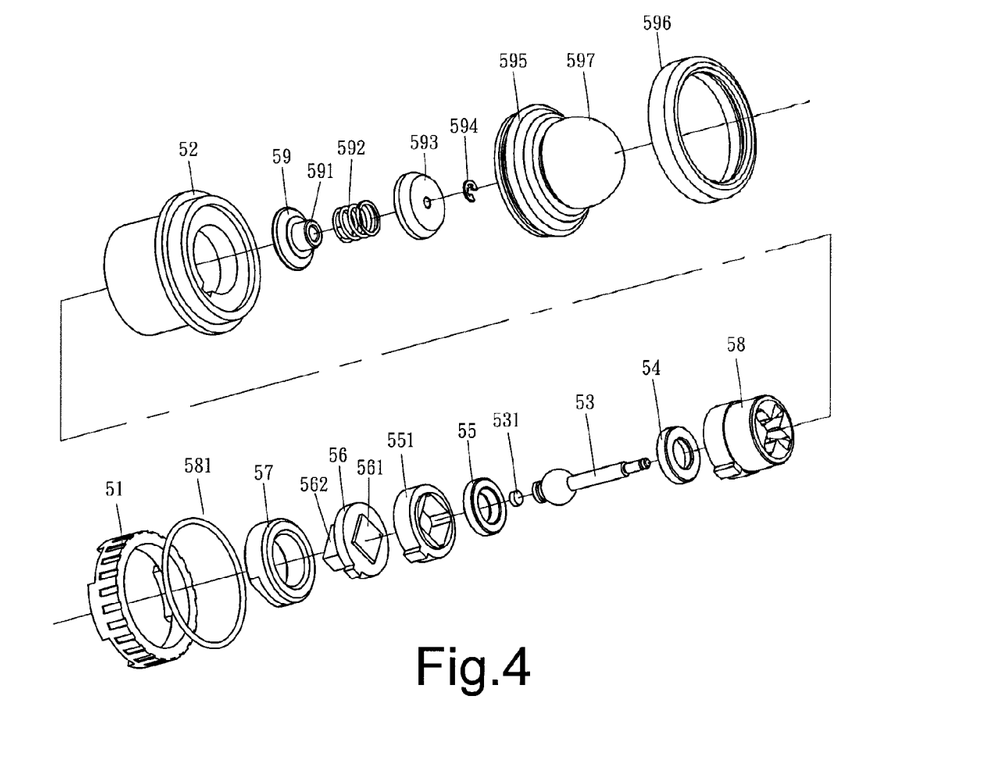
FIG. 4 is an exploded perspective view of a small secondary joystick member according to the present invention.

Referring to FIG. 4, the small secondary joystick member 5 includes a secondary-axis fixing nut 51, a secondary-axis base main body 52 resting partially on the secondary-axis fixing nut 51, and an O-ring 581 sandwiched therebetween. Received in the secondary-axis fixing nut 51 are the secondary-axis base main body 52, a secondary-axis ball stick 53, a secondary-axis upper copper ring 54, a secondary-axis lower copper ring 55, a secondary-axis copper-ring spacer 551, a control secondary circuit board 56, a secondary-axis fixing cover 57, and a secondary-axis fixing seat 58, wherein the secondary-axis ball stick 53 extends upward.

The secondary-axis ball stick 53 has an upper part formed as a shaft inserted into a secondary-axis sliding block 59. A spring 592 is mounted around a neck 591 extending upward from the secondary-axis sliding block 59 and has an upper end inserted into a secondary-axis spring stopping plate 593 and fixed in position by a C-ring 594. After a secondary-axis rubber dust guard 595 is mounted on the secondary-axis base main body 52, the secondary-axis rubber dust guard 595 and a secondary-axis knob 597 located thereabove are fixed in position by a secondary-axis upper fixing cover 596, thus completing the small secondary joystick member 5.

As with the ball stick 16, the secondary-axis ball stick 53 has a ball, whose lower end is fixedly provided with a magnet 531. Likewise, a secondary-joystick-member digital processing sensor 561 is provided on the control secondary circuit board 56 and corresponds in position to the magnet 531.

As the magnet 161 of the ball stick 16 moves, the primary-joystick-member digital processing sensor 21 on the control mainboard 2 performs calculation and outputs the calculation result directly through the output connector terminal 24.

On the other hand, the calculation result of the control secondary circuit board 56 of the small secondary joystick member 5 is connected to the input connector terminal 22 of the control mainboard 2 through a connector 562 at an end of an extension wire, so as to be supplied to the control mainboard 2. The pushbutton switch 46 is connected to the other input connector terminal 23 of the control mainboard 2 through a connector 461 at an end of an extension wire. In addition, the indicator lamp circuit board 381 is provided with an LED element 382 and is electrically connected to the input connector terminal 23 through a connector 383 at an end of an extension wire, so as for the control mainboard 2 to supply electric power and signals to the indicator lamp circuit board 381 according to the operational state of the joystick, and for the LED element 382 on the indicator lamp circuit board 381 to emit light toward the indicator lamp ring 38.

As shown in FIG. 3, the pushbutton switch 46 works in conjunction with the serial-signal, digital-signal, and analog-signal programs of the control mainboard 2 so as to provide multiple output modes to select from.

Figure 5:
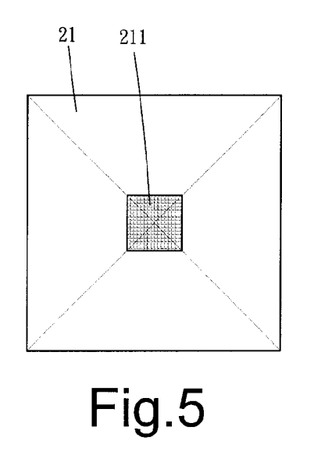
FIG. 5 schematically shows the dead band of a primary-joystick-member digital processing sensor according to the present invention.

Referring to FIG. 5, the primary-joystick-member digital processing sensor 21 on the control mainboard 2 has a dead band zone 211 set by the dead band setting program of the control mainboard 2. Thus, when the primary joystick member 1 is touched or shaken by accident and hence causes a center point of the magnet 161 of the primary joystick member 1 to move slightly within a predetermined radius from a center point of the dead band zone 211, no actions are activated.

The primary-joystick-member digital processing sensor 21 on the control mainboard 2 works in conjunction with the axial angle shift detection program of the control mainboard 2 in such a way that, when an operator trying to move the primary joystick member 1 applies a force thereto, the distance moved or the angle tilted must exceed a predetermined value in order to activate an instruction. Thus, incorrect operations which may otherwise result from touching or shaking the primary joystick member 1 unintentionally or which are contrary to the operator's intensions are prevented.

The primary-joystick-member digital processing sensor 21 on the control mainboard 2 also works in conjunction with the origin calibration circuit of the control mainboard 2. Therefore, even if the primary joystick member 1 moves to a point other than the original center point when resuming its original position, either during manufacture or after use for some time, that particular point will be re-set as the origin to thereby reduce operational errors or incorrect operations.

Figure 6:
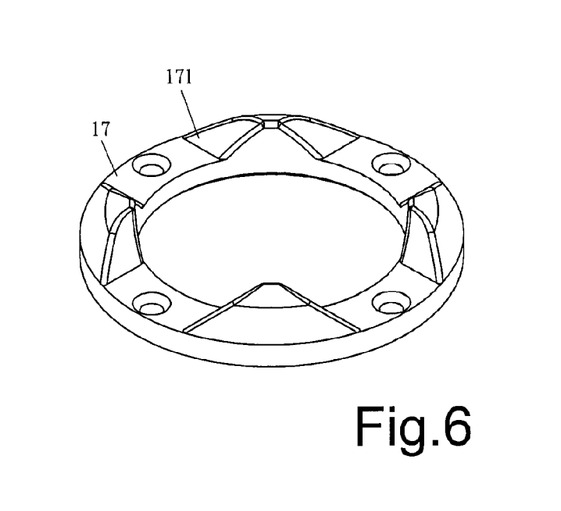
FIG. 6 is a perspective view of a fulcrum ring according to the present invention.
Figure 7:
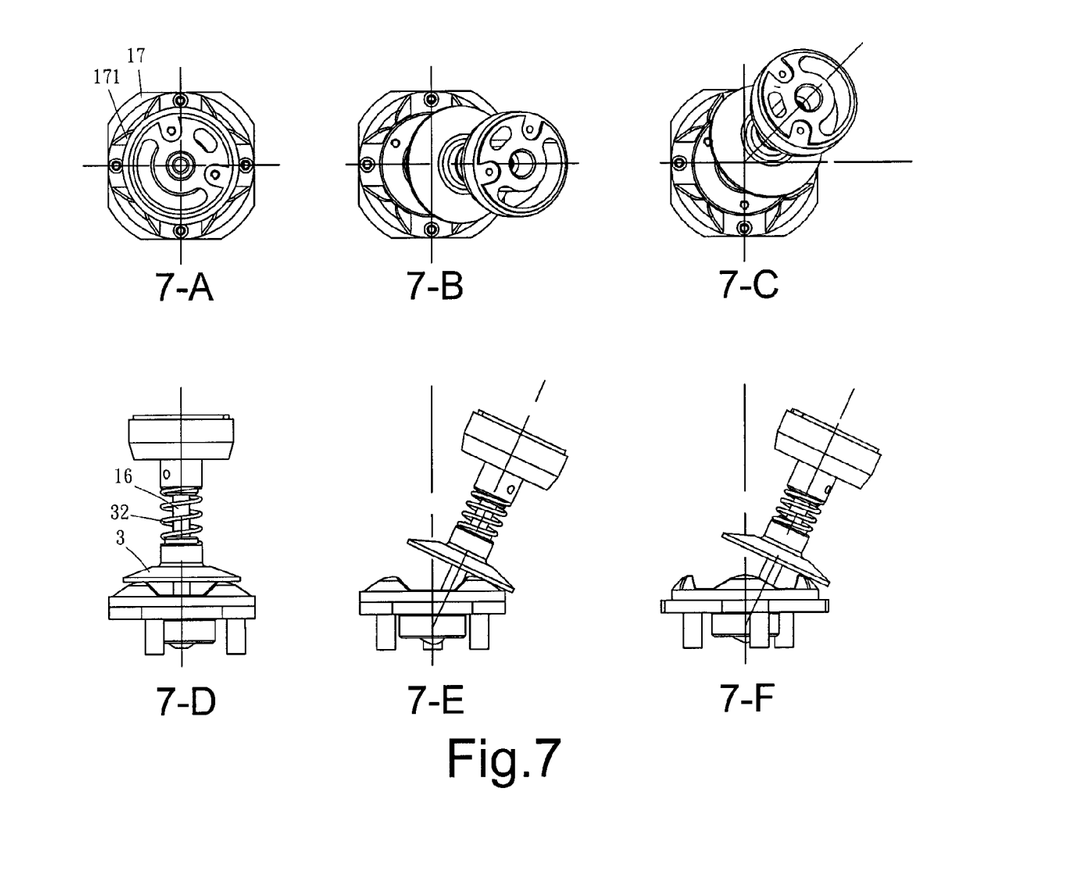

The diamond pyramid-shaped projections 171 on the fulcrum ring 17 function in the following manner. Referring to FIG. 6 and FIGS. 7-A through 7-F, when the ball stick 16 is moved, the relative position between the sliding block 3 and the diamond pyramid-shaped projections 171 changes, thus compressing the spring 32 by different amounts, and therefore resistance feedback from the spring 32 varies. When the primary joystick member 1 is moved along non-diagonal directions, the compression of the spring 32 is relatively small, and hence the resistance felt by the operator is relatively small; in other words, the primary joystick member 1 can be moved without much effort. However, when the primary joystick member 1 is moved diagonally, the spring 32 undergoes relatively large compression, meaning that the operator must feel relatively great resistance and has to exert much force. Thus, the feedback from force application allows the operator to know the distance and direction of movement as a reference for operation. Compared with the conventional single-spring center-resetting mechanisms, which react regardless of the direction of force application and therefore do not provide operational feedback, the present invention is truly inventive and non-obvious.

Figure 8:
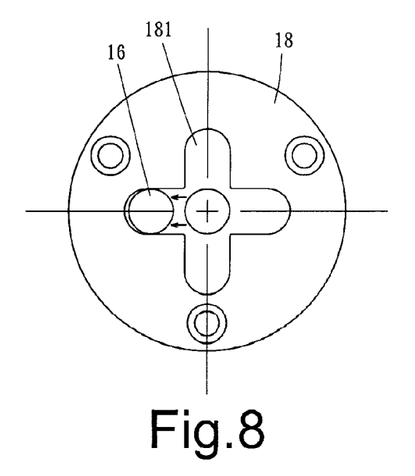
FIG. 8 is a top view of a cross-shaped non-diagonal direction limiting element according to the present invention.

Referring to FIG. 8, due to the cross-shaped opening 181 of the cross-shaped non-diagonal direction limiting element 18, only one non-diagonal output is permitted at a time when the joystick is operated. This design is especially suitable for use by machinery requiring only non-diagonal control and serves to prevent incorrect instructions or incorrect operations.

Figure 9:
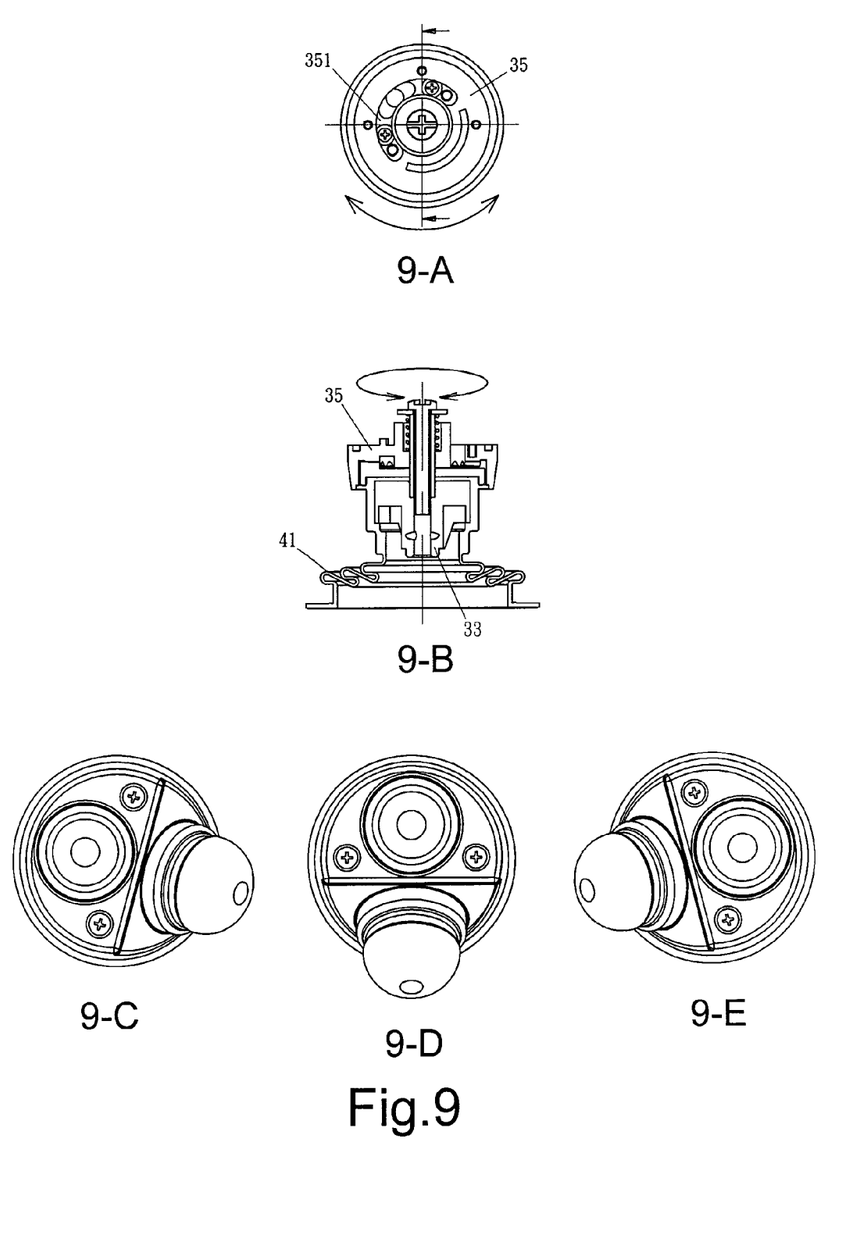

With reference to FIGS. 9-A to 9-E, after the handle base 33, the angle fixing plate 34, the rotating seat 35, the screw rod 36, and the spring pin 361 are assembled together, the primary joystick member 1 can be rotated to and positioned at different angles, so as to be used by left-handers as well as right-handers. Furthermore, the small secondary joystick member 5 is configured for non-rotational control. More specifically, the small secondary joystick member 5 is configured for intuitive operation and can be pushed upward, downward, leftward, and rightward according to the operator's body orientation.

Figure 10:
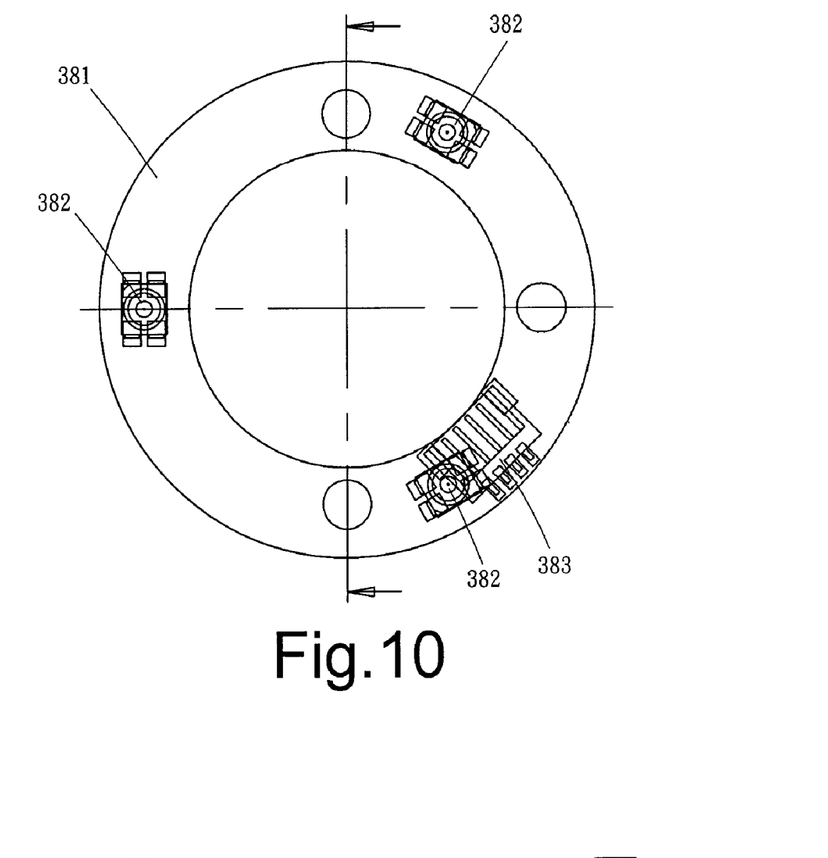
FIG. 10 is a top view of an indicator lamp circuit board according to the present invention.
Figure 11:
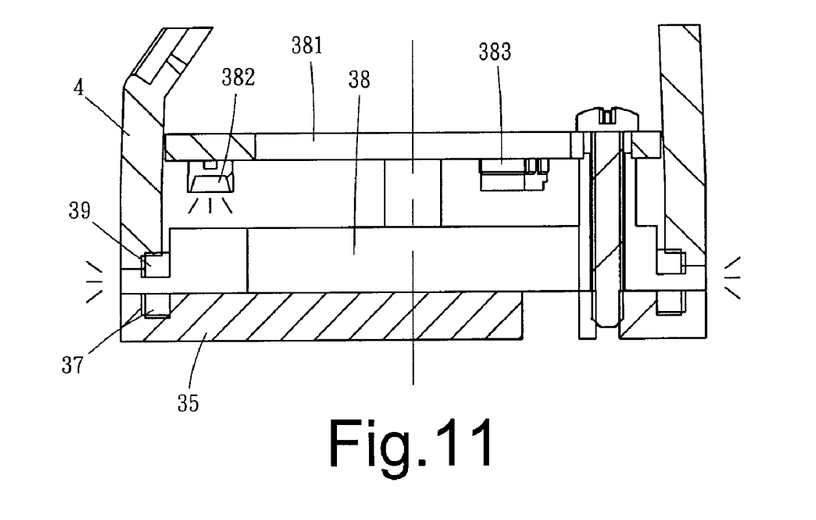
FIG. 11 is a sectional view showing light emission by the indicator lamp circuit board through an indicator lamp ring of the present invention.

Please refer to FIG. 10 and FIG. 11 for the indicator lamp ring 38 and the indicator lamp circuit board 381. As mentioned previously, the indicator lamp circuit board 381 is provided with the LED element 382. The control mainboard 2 supplies electric power and signals to the indicator lamp circuit board 381 according to the operational state of the joystick, such that the LED element 382 on the indicator lamp circuit board 381 emits light toward the indicator lamp ring 38.

Figure 12:
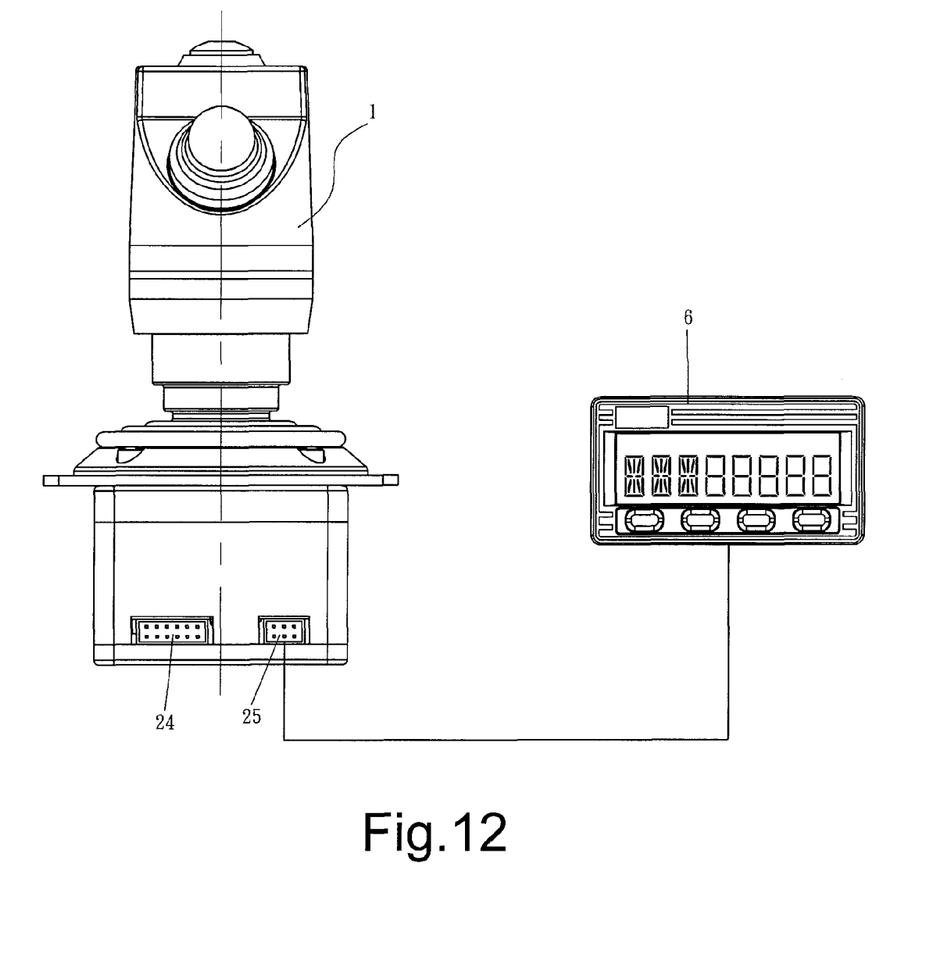
FIG. 12 is a schematic drawing showing the joystick of the present invention connected to a system surveillance device.

Referring to FIG. 12, the system surveillance connector terminal 25 of the control mainboard 2 allows the joystick of the present invention to be connected to a system surveillance device 6. The system surveillance device 6, once connected to the joystick, can rapidly determine whether or not the vectors of the joystick are normal.

Figure 13:
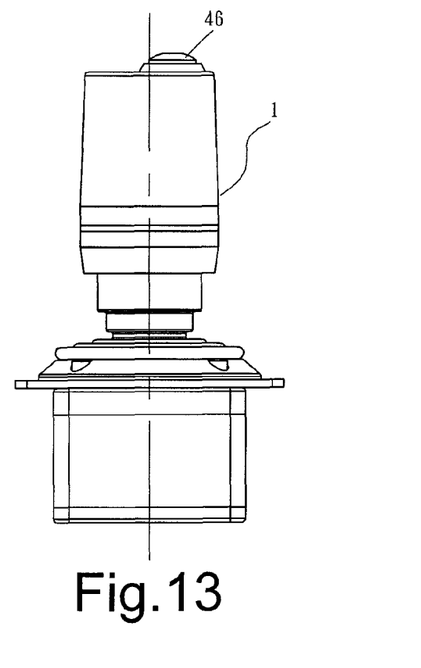
FIG. 13 is a schematic view of an embodiment of the joystick of the present invention without the small secondary joystick member.
Figure 14:
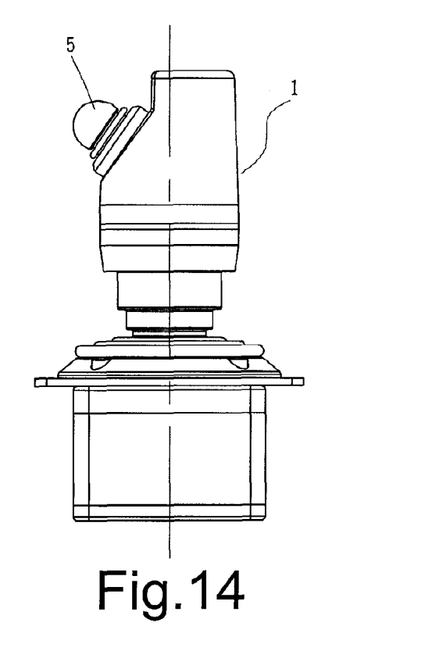
FIG. 14 is a schematic view of an embodiment of the joystick of the present invention without a pushbutton switch.
Figure 15:
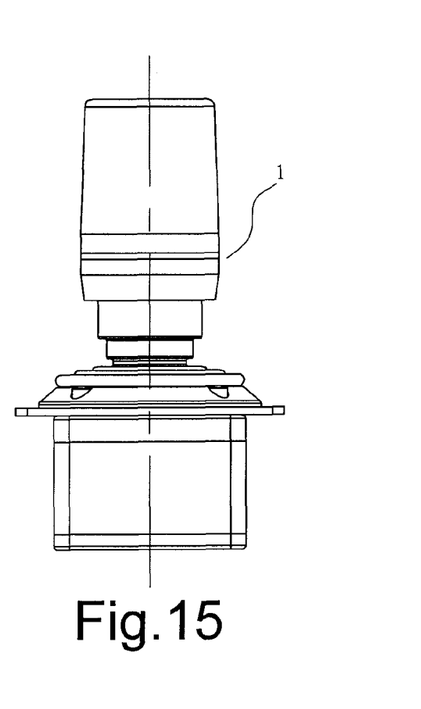
FIG. 15 is a schematic view of an embodiment of the joystick of the present invention without the small secondary joystick member and the pushbutton switch.
Figure 16:
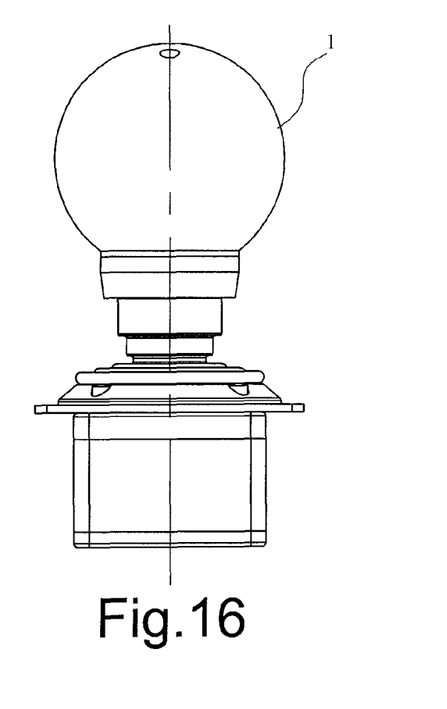
FIG. 16 is a schematic view of another embodiment of the joystick of the present invention without the small secondary joystick member and the pushbutton switch.

The primary joystick member 1 of the present invention can be implemented without the small secondary joystick member 5, as shown in FIG. 13; or without the pushbutton switch 46, as shown in FIG. 14; or without the small secondary joystick member 5 and the pushbutton switch 46, as shown in FIG. 15 and FIG. 16.

In short, the joystick having the foregoing design and structure is capable of simultaneous four-axis (X-, Y-, Z-, and C-axis) output control, allows selective switching of multiple output modes, can be set with a dead band, is suitable for use by both left-handers and right-handers, and provides such functions as axial angle shift detection, non-diagonal direction limitation, origin calibration, feedback from axial force application, Z- and C-axis intuitive operation, working status display, and system surveillance.

What is claimed is:

1. An intelligent multi-axial intuitive joystick suitable for use by both left-handers and right-handers comprising:
    a primary joystick member for control along X- and Y-axes, a small secondary joystick member for control along Z- and C-axes, and a pushbutton switch, wherein the small secondary joystick member and the pushbutton switch are provided on the primary joystick member;
    the primary joystick member comprises therein, from bottom to top, a box-shaped base, a control mainboard, a copper-ring fixing seat, an upper copper ring, a lower copper ring, a ball stick, a magnet provided at a lower end of the ball stick, a fulcrum ring, a cross-shaped non-diagonal direction limiting element, a sliding block, a spring, a handle base, an angle fixing plate, a rotating seat, a flat washer, an indicator lamp ring, an indicator lamp circuit board, a handle upper cover, a rubber dust guard, a main-body fixing plate, and a base upper cover, so as to form a hand-operated joystick member;
    the handle upper cover has a top end formed with a first hole and a lateral portion formed with a second hole, wherein one of the first and second holes is configured to receive the pushbutton switch, and the other of the first and second holes is configured to receive the small secondary joystick member for control along the Z- and C-axes;
    the small secondary joystick member comprises a secondary-axis fixing nut, a secondary-axis base main body resting partially on the secondary-axis fixing nut, and an O-ring sandwiched therebetween, wherein the secondary-axis fixing nut receives therein the secondary-axis base main body, a secondary-axis ball stick, a secondary-axis upper copper ring, a secondary-axis lower copper ring, a secondary-axis copper-ring spacer, a control secondary circuit board, a secondary-axis fixing cover, and a secondary-axis fixing seat, the secondary-axis ball stick extending upward and having an upper part formed as a shaft inserted into a secondary-axis sliding block, wherein a spring is mounted around a neck extending upward from the secondary-axis sliding block and has an upper end inserted into a secondary-axis spring stopping plate and fixed in position by a C-ring, and wherein after a secondary-axis rubber dust guard is mounted on the secondary-axis base main body, the secondary-axis rubber dust guard and a secondary-axis knob located thereabove are fixed in position by a secondary-axis upper fixing cover, thus completing the small secondary joystick member; and
    the secondary-axis ball stick has a ball, whose lower end is fixedly provided with a magnet.

2. The intelligent multi-axial intuitive joystick for use by both left-handers and right-handers as claimed in claim 1, wherein the control mainboard is provided with a microprocessor control circuit comprising: a switch program for selecting among serial-signal, digital-signal, and analog-signal programs; a dead-band setting program; an axial angle shift detection program; an origin calibration circuit; a primary-joystick-member digital processing sensor; input connector terminals; an output connector terminal; and a system surveillance connector terminal, wherein as the magnet of the ball stick moves, the primary-joystick-member digital processing sensor performs calculation and outputs a calculation result directly through the output connector terminal.

3. The intelligent multi-axial intuitive joystick for use by both left-handers and right-handers as claimed in claim 2, wherein the primary-joystick-member digital processing sensor on the control mainboard has a dead band zone set by the dead band setting program of the control mainboard such that, when the primary joystick member is touched or shaken by accident and hence causes a center point of the magnet of the primary joystick member to move slightly within a predetermined radius from a center point of the dead band zone, no actions are activated.

4. The intelligent multi-axial intuitive joystick for use by both left-handers and right-handers as claimed in claim 2, wherein the primary-joystick-member digital processing sensor works in conjunction with the axial angle shift detection program such that an operator applying a force to the primary joystick member must move or tilt the primary joystick member by an amount exceeding a predetermined value in order to activate an instruction, thereby preventing incorrect operations which may otherwise result from touching or shaking the primary joystick member unintentionally or which are contrary to the operator's intensions.

5. The intelligent multi-axial intuitive joystick for use by both left-handers and right-handers as claimed in claim 2, wherein the primary-joystick-member digital processing sensor works in conjunction with the origin calibration circuit such that, even if the primary joystick member, upon resuming its original position during manufacture or after use for some time, moves to a point other than an original center point, said point is re-set as an origin to thereby reduce operational errors or incorrect operations.

6. The intelligent multi-axial intuitive joystick for use by both left-handers and right-handers as claimed in claim 1, wherein a secondary-joystick-member digital processing sensor is provided on the control secondary circuit board and corresponds in position to the magnet of the secondary-axis ball stick, wherein as the magnet of the secondary-axis ball stick moves, the secondary-joystick-member digital processing sensor performs calculation, and a calculation result of the secondary-joystick-member digital processing sensor is connected to a said input connector terminal of the control mainboard through a connector at an end of an extension wire, so as to be supplied to the control mainboard.

7. The intelligent multi-axial intuitive joystick for use by both left-handers and right-handers as claimed in claim 1, wherein the fulcrum ring is provided with diamond pyramid-shaped projections such that, when the ball stick is moved, a relative position between the sliding block and the diamond pyramid-shaped projections changes, thus compressing the spring of the primary joystick member by different amounts, and therefore resistance feedback from the spring of the primary joystick member varies, wherein the resistance feedback resulting from an operator's force application allows the operator to know an amount and a direction of movement as a reference for operation.

8. The intelligent multi-axial intuitive joystick for use by both left-handers and right-handers as claimed in claim 1, wherein the cross-shaped non-diagonal direction limiting element has a cross-shaped opening such that only one non-diagonal output is permitted at a time when the joystick is operated, thereby preventing incorrect instructions or incorrect operations and rendering the joystick suitable for use by machinery requiring only non-diagonal control.

9. The intelligent multi-axial intuitive joystick for use by both left-handers and right-handers as claimed in claim 1, wherein the angle fixing plate is formed with symmetric positioning blocks, and the rotating seat has a circular groove, the circular groove being inserted by a screw rod, a sleeve, and a spring, the handle base being laterally inserted by a spring pin, such that the handle base, the angle fixing plate, and the rotating seat are assembled into a one-piece unit capable of being rotated to different positions, thus allowing the primary joystick member to be rotated to and positioned at different angles and be comfortably used by left-handers as well as right-handers.

10. The intelligent multi-axial intuitive joystick for use by both left-handers and right-handers as claimed in claim 1, wherein the indicator lamp circuit board is provided with an LED element and is electrically connected to a said input connector terminal of the control mainboard through a connector at an end of an extension wire, so as for the control mainboard to supply electric power and signals to the indicator lamp circuit board according to an operational state of the joystick, and for the LED element on the indicator lamp circuit board to emit light toward the indicator lamp ring.

11. The intelligent multi-axial intuitive joystick for use by both left-handers and right-handers as claimed in claim 1, wherein the small secondary joystick member is configured for intuitive operation and can be pushed upward, downward, leftward, and rightward according to an operator's body orientation.

12. The intelligent multi-axial intuitive joystick for use by both left-handers and right-handers as claimed in claim 1, wherein the pushbutton switch is connected to a said input connector terminal of the control mainboard through a connector at an end of an extension wire, so as to work in conjunction serial-signal, digital-signal, and analog-signal programs built-in the control mainboard and thereby provide multiple output modes for selection.

13. The intelligent multi-axial intuitive joystick for use by both left-handers and right-handers as claimed in claim 1, wherein the system surveillance connector terminal of the control mainboard allows the joystick to connect with a system surveillance device so as for the system surveillance device to rapidly determine whether or not vectors of the joystick are normal.

14. An intelligent multi-axial intuitive joystick suitable for use by both left-handers and right-handers comprising:
a primary joystick member for control along X- and Y-axes, and a pushbutton switch located on the primary joystick member;
the primary joystick member comprises therein, from bottom to top, a box-shaped base, a control mainboard, a copper-ring fixing seat, an upper copper ring, a lower copper ring, a ball stick, a magnet provided at a lower end of the ball stick, a fulcrum ring, a cross-shaped non-diagonal direction limiting element, a sliding block, a spring, a handle base, an angle fixing plate, a rotating seat, a flat washer, an indicator lamp ring, an indicator lamp circuit board, a handle upper cover, a rubber dust guard, a main-body fixing plate, and a base upper cover, so as to form a hand-operated joystick member;
the handle upper cover has a top end formed with a hole, wherein the hole is configured to receive the pushbutton switch.

15. An intelligent multi-axial intuitive joystick suitable for use by both left-handers and right-handers comprising:
a primary joystick member for control along X- and Y-axes;
the primary joystick member comprises therein, from bottom to top, a box-shaped base, a control mainboard, a copper-ring fixing seat, an upper copper ring, a lower copper ring, a ball stick, a magnet provided at a lower end of the ball stick, a fulcrum ring, a cross-shaped non-diagonal direction limiting element, a sliding block, a spring, a handle base, an angle fixing plate, a rotating seat, a flat washer, an indicator lamp ring, an indicator lamp circuit board, a handle upper cover, a rubber dust guard, a main-body fixing plate, and a base upper cover, so as to form a hand-operated joystick member.

16. The intelligent multi-axial intuitive joystick suitable for use by both left-handers and right-handers according to claim 15, further comprising:
a small secondary joystick member for control along Z- and C-axes, the small secondary joystick member is located on the primary joystick member;
the handle upper cover has a lateral portion formed with a hole, wherein the hole is configured to receive the small secondary joystick member for control along the Z- and C-axes;
the small secondary joystick member comprises a secondary-axis fixing nut, a secondary-axis base main body resting partially on the secondary-axis fixing nut, and an O-ring sandwiched therebetween, wherein the secondary-axis fixing nut receives therein the secondary-axis base main body, a secondary-axis ball stick, a secondary-axis upper copper ring, a secondary-axis lower copper ring, a secondary-axis copper-ring spacer, a control secondary circuit board, a secondary-axis fixing cover, and a secondary-axis fixing seat, the secondary-axis ball stick extending upward and having an upper part formed as a shaft inserted into a secondary-axis sliding block, wherein a spring is mounted around a neck extending upward from the secondary-axis sliding block and has an upper end inserted into a secondary-axis spring stopping plate and fixed in position by a C-ring, and wherein after a secondary-axis rubber dust guard is mounted on the secondary-axis base main body, the secondary-axis rubber dust guard and a secondary-axis knob located thereabove are fixed in position by a secondary-axis upper fixing cover, thus completing the small secondary joystick member; and the secondary-axis ball stick has a ball, whose lower end is fixedly provided with a magnet.

* * * * *